D. H. Chamberlain,
Hand Stamp.
No. 2734. Reissued Aug. 13 1867.
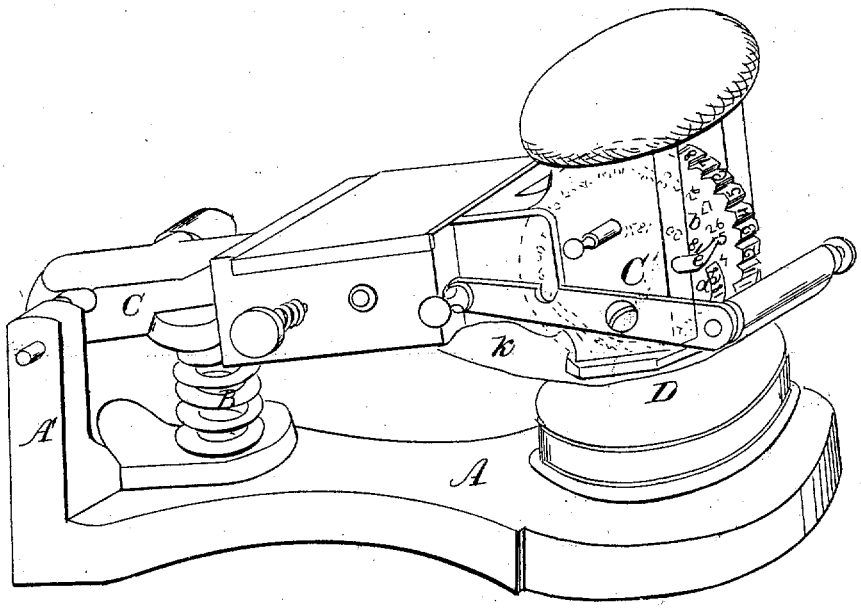
Witnesses,
M. S. G. Wilde,
David Kelleher.
Dexter H. Chamberlain

United States Patent Office.

NATHANIEL L. CHAMBERLAIN, OF BOSTON, MASSACHUSETTS, ASSIGNEE OF DEXTER H. CHAMBERLAIN.

*Letters Patent No.* 66,561, *dated July* 9, 1867; *reissue No.* 2,734, *dated August* 13, 1867.

IMPROVEMENT IN HAND-STAMPS.

The Schedule referred to in these Letters Patent and making part of the same.

TO ALL WHOM IT MAY CONCERN:

Be it known that I, NATHANIEL L. CHAMBERLAIN, of Boston, in the county of Suffolk, and State of Massachusetts, am the owner by assignment of certain Letters Patent of the United States for an Improvement in Hand-Stamps, of which the following is a full, clear, and exact description, reference being had to the accompanying drawing, making a part of this specification, and representing a perspective view of a hand-stamp containing my improvement.

The invention is designed as an improvement upon a hand-stamp for which Letters Patent were granted to Dexter H. Chamberlain on January 22, 1867. One of the objections in the above-mentioned patent was the difficulty experienced in readily setting the large type-wheel which indicates the day of the month, the number to be imprinted being on the under side of the said wheel and consequently out of sight, and in setting the wheel close observation and attention are required to bring the desired number to its proper place. The object of my invention is to overcome this difficulty, and the invention consists in forming on the side of the large or central type-wheel, either by impressing, engraving, or otherwise attaching, a series of figures corresponding in number to those on the circumference of the said wheel, and in such a relative position to the latter that the number on the side of the wheel corresponding with any indicating point or portion of the device will determine the exact number on the type-wheel to be printed. Thus the type-wheel can be readily set without any delay or uncertainty, rendering the operation easy, and effecting it with greater dispatch than in the ordinary method.

Referring to the drawings, A represents the base of the stamp, having an upright, A′, at its rear end, which supports the arm C, the latter being held in an elevated position at its front end by means of a coiled spring, B. Two spindles are arranged within the central portion of the arm C, upon which the inking-ribbon is wound. D represents the cushion. All the above are constructed and operate as described in the patent previously referred to. The number of the days of a month are formed on the periphery of the wheel *b*, which is arranged to rotate between wheels of smaller diameter on either side, the latter being designed to indicate respectively the mouth and year. Upon the side of the wheel *b* is formed a series of numbers arranged in such a manner that when the required number on the periphery of the wheel is in the proper position for making the impression the corresponding number on the side of the wheel may be indicated by a pointer attached in any convenient position to the main frame, or a portion of the frame may serve as an indicator, such as the standard C′, the figures being so arranged that the first one that appears in sight on the wheel *b* will indicate the number to be impressed. The several type-wheels are held in position by means of spring pins passing through the standard C′ and entering holes in the sides of the wheels. By reason of the enlarged diameter of the central wheel *b* a considerable space is left exposed on the sides of the same, above or beyond the side-wheels, which enables the numbers to be readily seen, and the position of the wheel can be quickly changed to mark a higher or lower number, when necessary, without requiring close inspection or careful adjustment.

What I claim as new, and desire to secure by Letters Patent, is—

The type-wheel *b*, having figures upon its side, when the said wheel is arranged between and used in combination with two wheels of smaller diameter, as and for the purpose set forth.

NATH'EL L. CHAMBERLAIN,

Witnesses:

J. H. ADAMS,

J. M. SCHRÖEDER.